(12) United States Patent
Kim et al.

(10) Patent No.: US 9,553,497 B2
(45) Date of Patent: Jan. 24, 2017

(54) HORIZONTAL LINEAR VIBRATOR

(71) Applicant: SAMSUNG ELECTRO-MECHANICS CO., LTD., Suwon, Gyunggi-do (KR)

(72) Inventors: Yong Jin Kim, Gyunggi-do (KR); Jun Kun Choi, Gyunggi-do (KR); Jae Woo Jun, Gyunggi-do (KR); Ki Suk Woo, Seoul (KR); Kwang Hyung Lee, Gyunggi-do (KR); Je Hyun Bang, Gyunggi-do (KR); Seok Jun Park, Gyunggi-do (KR); Kyung Ho Lee, Gyunggi-do (KR); Hwa Young Oh, Seoul (KR)

(73) Assignee: MPLUS CO., LTD., Suwon-si, Gyeonggi-do (KR)

( * ) Notice: Subject to any disclaimer, the term of this patent is extended or adjusted under 35 U.S.C. 154(b) by 657 days.

(21) Appl. No.: 13/874,383

(22) Filed: Apr. 30, 2013

(65) Prior Publication Data

US 2014/0152126 A1   Jun. 5, 2014

Related U.S. Application Data

(63) Continuation-in-part of application No. 12/563,001, filed on Sep. 18, 2009, now abandoned.

(30) Foreign Application Priority Data

Jul. 22, 2009   (KR) .................. 10-2009-0066872

(51) Int. Cl.
   *H02K 33/02*   (2006.01)
   *H02K 33/16*   (2006.01)
   *B06B 1/04*    (2006.01)

(52) U.S. Cl.
   CPC .............. *H02K 33/16* (2013.01); *B06B 1/045* (2013.01); *H02K 33/02* (2013.01)

(58) Field of Classification Search
   CPC .......... H02K 33/02; H02K 33/16; B06B 1/045
   (Continued)

(56) References Cited

U.S. PATENT DOCUMENTS 3,312,841 A * 4/1967 Shinobu ................. H02K 33/04
                                                              310/15
5,107,157 A   4/1992 Ito
(Continued)

FOREIGN PATENT DOCUMENTS

CN         1150716         5/1997
KR     20060120859 A  * 11/2006
KR    10-2008-0107506 A   12/2008

OTHER PUBLICATIONS

KR 2006-0120859 English translation, published on 2006.*
(Continued)

*Primary Examiner* — John K Kim
(74) *Attorney, Agent, or Firm* — LRK Patent Law Firm

(57) ABSTRACT

The present invention provides a horizontal linear vibrator which can reduce the thickness but increase vibration strength while at the same time guaranteeing a sufficiently long lifetime and satisfactory responsivity. The horizontal linear vibrator includes a casing, a bracket, a vibration unit and springs. The casing defines an internal space therein. The bracket is disposed under the casing. A cylindrical coil is provided on the bracket. The vibration unit has a magnet, a yoke and a weight. The yoke contains the magnet therein and is open on the lower end thereof. The weight is coupled to the outer surface of the yoke. The springs are coupled to sidewall plates of the casing or the bracket. The springs (Continued)

elastically support the vibration unit to allow the vibration unit to vibrate in the horizontal direction.

5 Claims, 5 Drawing Sheets

(58) Field of Classification Search
USPC ...... 310/12.21, 12.24, 14, 15, 23, 25, 30, 34
IPC ...................................................... H02K 33/02
See application file for complete search history.

(56) References Cited

U.S. PATENT DOCUMENTS

| | | | |
|---|---|---|---|
| 5,604,816 A | 2/1997 | Totani | |
| 5,632,087 A * | 5/1997 | Motohashi | H02K 33/10 30/43.9 |
| 5,736,797 A | 4/1998 | Motohashi et al. | |
| 5,831,352 A | 11/1998 | Takei | |
| 6,084,319 A | 7/2000 | Kamata et al. | |
| 6,181,090 B1 * | 1/2001 | Amaya | H02P 25/032 310/50 |
| 6,466,682 B2 | 10/2002 | An | |
| 7,053,507 B2 | 5/2006 | Kobayashi et al. | |
| 7,170,205 B2 | 1/2007 | Won et al. | |
| 7,408,444 B2 * | 8/2008 | Dufosse | H04R 9/06 340/384.1 |
| 2004/0130832 A1 * | 7/2004 | Nakamura | G11B 5/5552 360/294.5 |
| 2004/0169425 A1 | 9/2004 | Aihara | |
| 2005/0121984 A1 | 6/2005 | Nakamura et al. | |
| 2005/0122629 A1 | 6/2005 | Nakamura et al. | |
| 2005/0127759 A1 | 6/2005 | Kraus et al. | |
| 2005/0140219 A1 * | 6/2005 | Sanematsu | H02K 33/16 310/36 |
| 2005/0275294 A1 | 12/2005 | Izumi et al. | |
| 2007/0024134 A1 * | 2/2007 | Huang | H02K 7/063 310/81 |
| 2007/0138904 A1 | 6/2007 | Chae | |
| 2007/0205674 A1 | 9/2007 | Tseng et al. | |
| 2011/0018367 A1 * | 1/2011 | Kim | B06B 1/045 310/25 |
| 2014/0152126 A1 * | 6/2014 | Kim | B06B 1/045 310/25 |

OTHER PUBLICATIONS

Office Action from counterpart Chinese Patent Application No. 2009-10206638.X, mailed Jul. 3, 2012, 14 pages including English Summary.
Wikipedia, "cylinder", www.wikipedia.com.
Office Action from counterpart Korean Patent Application No. 10-2009-0066872, mailed Aug. 30, 2011, 5 pages.
Office Action from counterpart Korean Patent Application No. 10-2009-0066872, mailed Jan. 7, 2011, 5 pages.
Kim, et al., Korean Patent Application No. 10-2006-0120859, English Translation (machine translation), filed May 23, 2005, 17 pages.

* cited by examiner

HORIZONTAL LINEAR VIBRATOR

CROSS REFERENCE TO RELATED APPLICATION

This application is a continuation-in-part of U.S. patent application Ser. No. 12/563,001, filed Sep. 18, 2009 which claims the benefit of Korean Patent Application No. 10-2009-0066872, filed Jul. 22, 2009, entitled "HORIZONTAL LINEAR VIBRATOR", which is hereby incorporated by reference in its entirety into this application.

BACKGROUND OF THE INVENTION

1. Technical Field

The present invention relates to a horizontal linear vibrator.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

However, in the vibration generating unit having such a structure, when the brush passes through a gap between segments of the commutator, mechanical friction, electric sparks or abrasion is induced, thus creating impurities, such as black powder, thereby reducing the lifetime of the vibration generating unit. A vertical linear vibrator was proposed to overcome these problems, and representative examples of which can produce reliable linear vibration.

FIG. 1 is a sectional view of a vertical linear vibrator according to a conventional art.

As shown in FIG. 1, the vertical linear vibrator 10 according to the conventional art includes a casing 20, a bracket 30, a vibration unit 40 and a spring 50. The casing 20 defines a space therein. The bracket 30 supports thereon a coil 32 which forms a magnetic field using an electric current applied to the coil 32. A damper 34 is provided on the bracket 30. The vibration unit 40 includes a yoke 42 which has a hollow space therein and is closed on one end thereof, a magnet 44 which is installed in the hollow space of the yoke 42 and provided with a plate yoke 43 attached to the lower surface thereof, and a weight 46 which is fitted over the circumferential surface of the yoke 42. The spring 50 is coupled to the upper surface of the casing 20 to elastically support the vibration unit 40 such that it linearly vibrates. The yoke 42 includes a disk part 42a and a rim part 42b which is bent downwards from the outer edge of the disk part 42a and extends a predetermined length.

In the vertical linear vibrator 10 having the above-mentioned construction, when power is applied to the coil 32, the vibration unit 40 vibrates upwards and downwards by the spring 50 due to interaction between a magnetic field which is generated by a magnetic circuit including the cylindrical magnet 44, the plate yoke 43 and the yoke 42, and an electric field generated by the coil 32.

However, in the vertical linear vibrator 10, because the vibration quantity is proportional to a value obtained by multiplying the weight of the vibration unit 40 by a displacement thereof, the weight or displacement of the vibration unit 40 must be increased to ensure sufficient vibration quantity. This induces a disadvantage of the vertical linear vibrator 10 being increased in thickness. Furthermore, this structure cannot conform to the trend of small and slim cellular phones.

SUMMARY OF THE INVENTION

The present invention has been made in an effort to provide a horizontal linear vibrator which can reduce the thickness but increase vibration strength while at the same time guaranteeing a sufficiently long lifetime and satisfactory responsivity.

In order to accomplish the above object, the present invention provides a horizontal linear vibrator, including: a casing defining an internal space therein; a bracket disposed under the casing, with a cylindrical coil provided on the bracket; a vibration unit comprising: a yoke provided with a magnet attached to an upper surface thereof, the yoke being open on a lower end thereof; and a weight coupled to an outer surface of the yoke; and springs coupled to both ends of the casing or the bracket, the springs elastically supporting the vibration unit to allow the vibration unit to vibrate in the horizontal direction, wherein the yoke comprises: an upper plate provided on a lower surface thereof with the magnet; a side plate bent downwards from the upper plate; and a bottom plate bent inwards from the side plate, the bottom plate extending a predetermined length parallel to the upper plate, with an opening being formed through a portion of the bottom plate, and a circuit board is provided on an upper surface of the bracket, and a coil guide perpendicularly protrudes from an upper surface of the circuit board, so that the cylindrical coil is supported by the coil guide, and the coil guide supports the cylindrical coil such that the cylindrical coil is disposed in the yoke through the opening of the bottom plate of the yoke.

In the horizontal linear vibrator, a damper may be provided on each of the both ends of the casing or the bracket to prevent the vibration unit from coming into direct contact with the casing or the bracket.

Furthermore, the cylindrical coil may be disposed parallel to the magnet.

The magnet may comprise a plurality of magnets arranged such that different poles thereof are disposed on a same plane.

In addition, plates may be provided on both ends of the weight. The plates may fasten the corresponding ends of the springs to the weight.

As well, each of the springs may comprise a coil spring or a plate spring.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
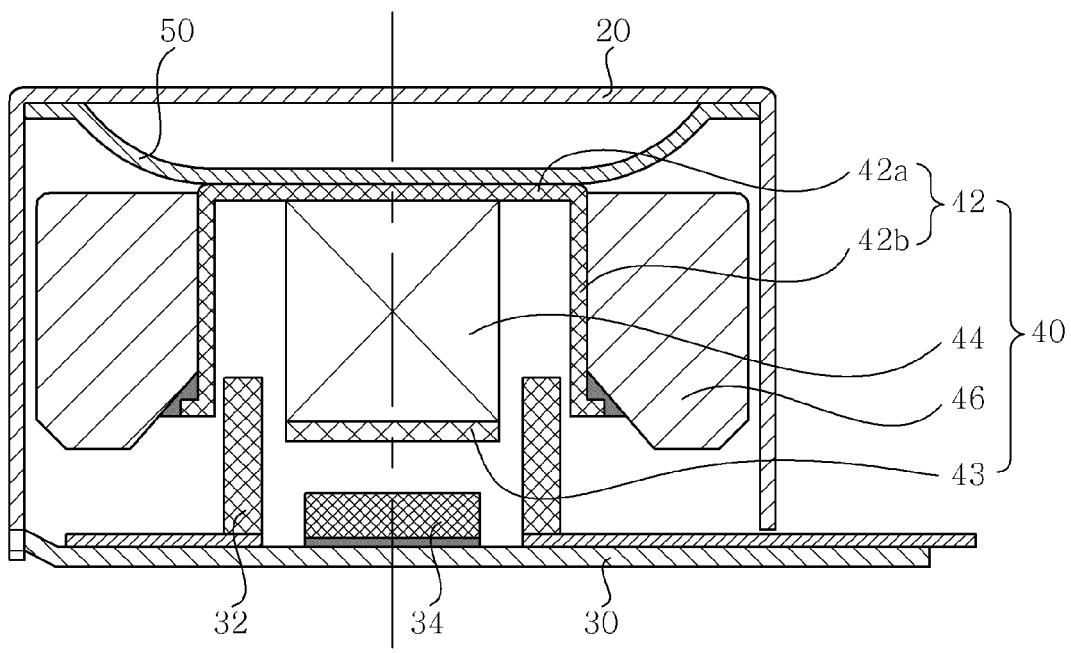
FIG. 1 is a sectional view showing a linear vibrator, according to a conventional art.

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Hereinafter, an embodiment of the present invention will be described in detail with reference to the attached drawings.

Figure 2:
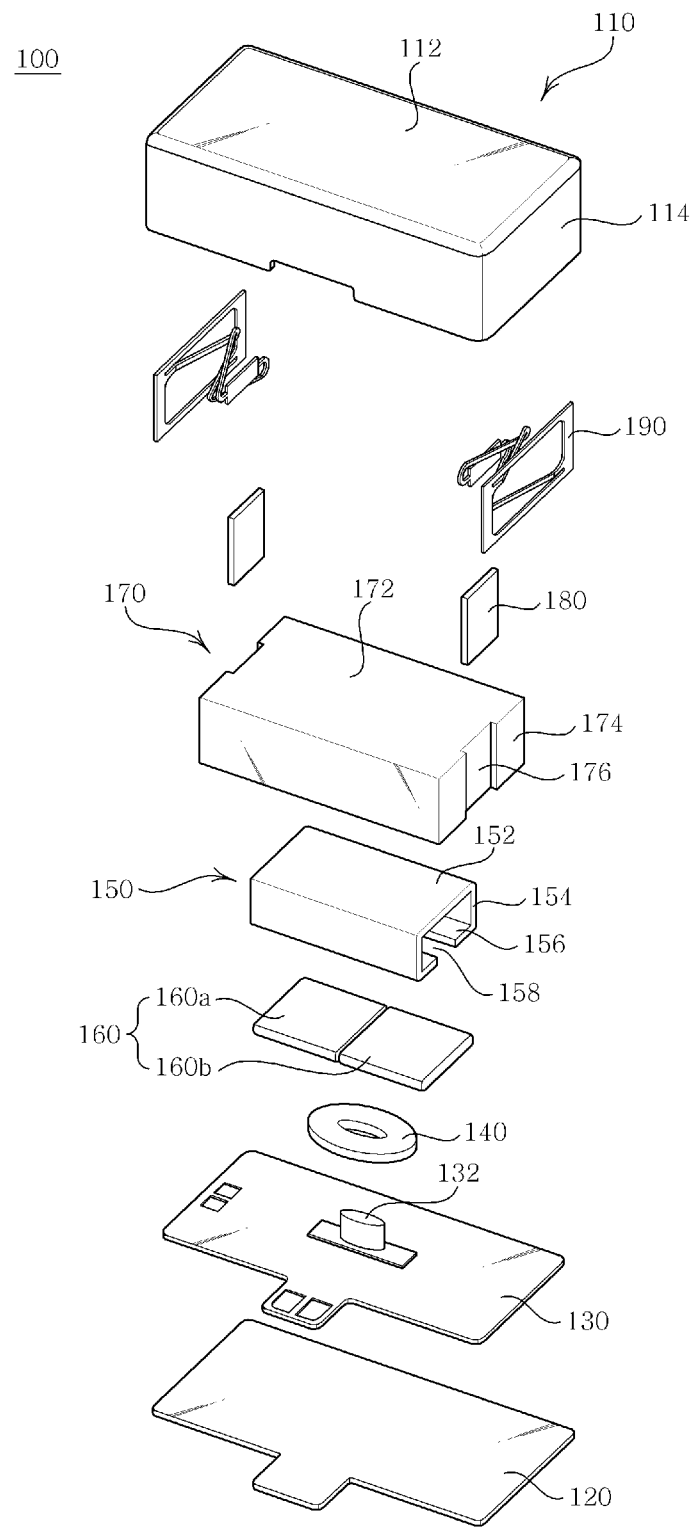
FIG. 2 is an exploded perspective view of a horizontal linear vibrator, according to an embodiment of the present invention.
Figure 3:
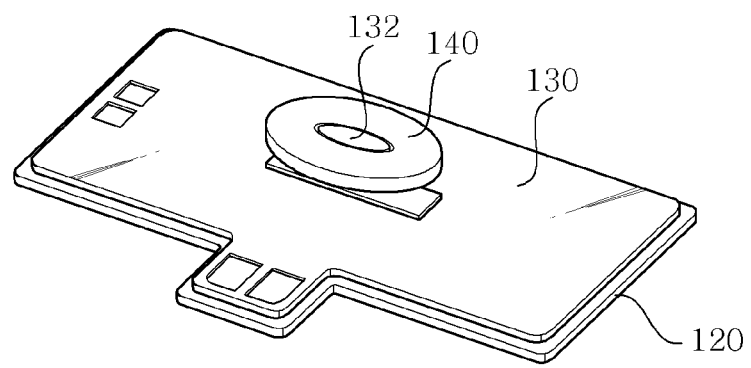
FIG. 3 is an assembled perspective view showing a bracket, a circuit board and a cylindrical coil according to the embodiment of the present invention.
Figure 4:
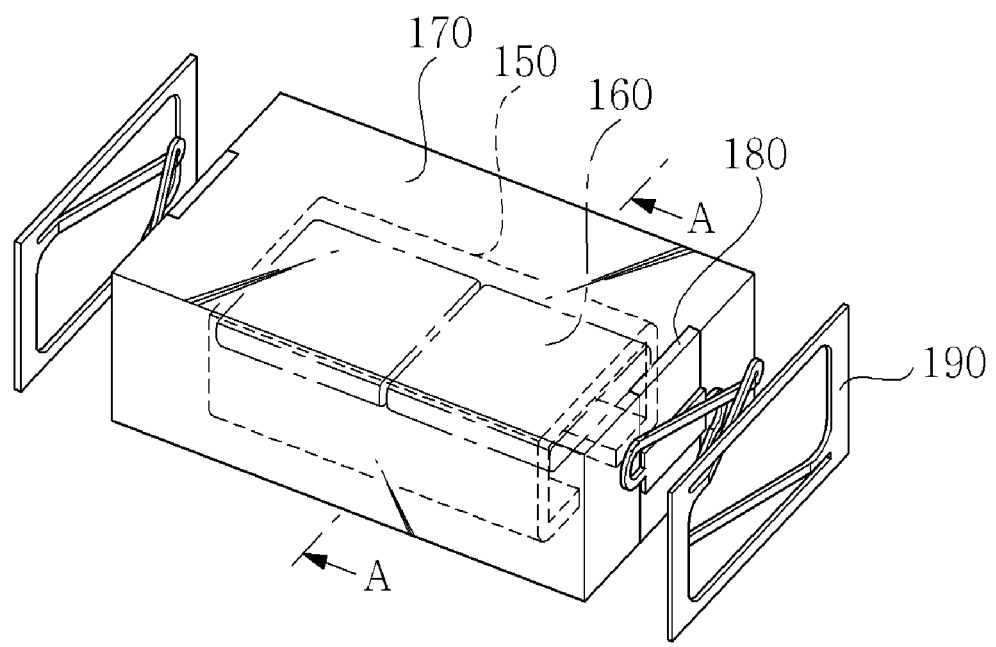
FIG. 4 is an assembled perspective view showing a vibration unit and springs according to the embodiment of the present invention.
Figure 5:
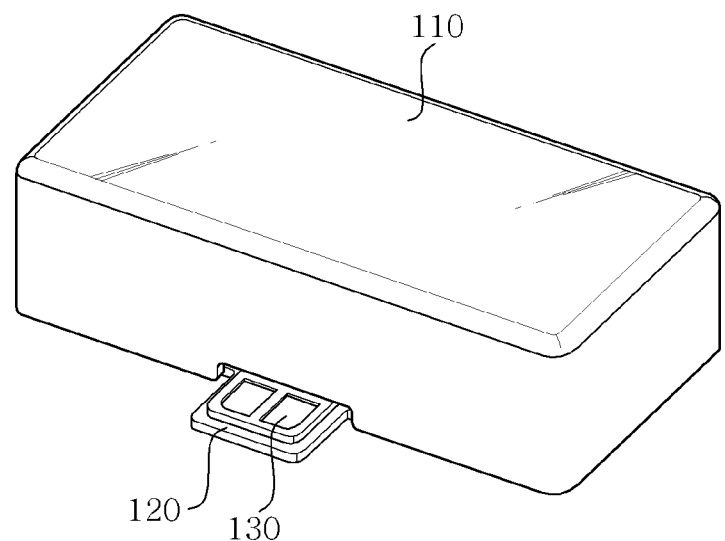
FIG. 5 is a perspective view of the assembled horizontal linear vibrator according to the embodiment of the present invention.

FIG. 2 is an exploded perspective view of a horizontal linear vibrator 100, according to an embodiment of the present invention. FIG. 3 is an assembled perspective view showing a bracket 120, a circuit board 130 and a cylindrical coil 140 according to the embodiment of the present invention. FIG. 4 is an assembled perspective view showing a vibration unit and springs 190 according to the embodiment of the present invention. FIG. 5 is a perspective view of the assembled horizontal linear vibrator 100 according to the embodiment of the present invention. The horizontal linear vibrator 100 according to the embodiment will be described in detail with reference to these drawings.

As shown in FIGS. 2 through 5, the horizontal linear vibrator 100 of the present invention includes a casing 110, the bracket 120, the vibration unit and the springs 190.

The casing 110 protects the horizontal linear vibrator 100 from the outside and provides space for the vibration unit to be displaced and to vibrate in the horizontal direction. That is, the casing 110 is a member providing an internal space for the horizontal linear vibrator 100. In detail, the internal space is defined by the assembly of the casing 110 and the bracket 120.

The casing 110 may have any structure, so long as it forms an internal space when it is assembled with the bracket 120.

Preferably, the casing 110 has a rectangular structure whose longitudinal length (the direction in which the vibration unit horizontally vibrates) is longer than that in the lateral direction, so that the horizontal displacement space of the vibration unit can be sufficiently guaranteed.

In this embodiment, the casing 110 includes an upper plate 112 and sidewall plates 114 which are bent perpendicularly down from the edges of the upper plate 114. The sidewall plates 114 include longitudinal side plates which extend in the longitudinal direction of the casing 110, and lateral side plates which extend in the lateral direction of the casing 110.

Here, a damper (not shown) may be provided on each lateral side plate 114 of the casing 110 to absorb shock applied to the vibration unit and prevent the vibration unit from coming into direct contact with the casing 110 when the vibration unit horizontally vibrates. A variety of materials which are capable of absorbing shocks, such as rubber, polypropylene, etc., can be used as the material for the damper.

The bracket 120 is coupled to the lower end of the casing 110 to define the internal space. Furthermore, the bracket 120 provides space for mounting the circuit board 130 and the cylindrical coil 140.

In detail, the bracket 120 has a planar shape and covers the open lower end of the casing 110. However, the configuration of the casing 110 and the bracket 120 shown in FIG. 2 is only one example of the structure in which the casing 110 may be assembled with the bracket 120 to form the internal space in which the vibration unit vibrates. For example, alternatively, the casing 110 and the bracket 120 may be configured such that the casing 110 has a planar shape while the bracket 120 has a rectangular box shape which is open on the upper end thereof. As well, those skilled in this art will easily understand that the configuration of the casing 110 and the bracket 120 can be variously modified.

The circuit board 130 having a pattern thereon is provided on the upper surface of the bracket 120 (refer to FIG. 3). The circuit board 130 is connected to an external input terminal to transmit power to the cylindrical coil 140. A coil guide 132 perpendicularly protrudes from the upper surface of the circuit board 130. In FIG. 2, although the circuit board 130 has been illustrated as being provided separately from the bracket 120, they may be integrally formed into a single body using the same material. This can also fall within the bounds of the present invention.

Furthermore, the cylindrical coil 140 is disposed on the bracket 120 and generates an electric field of a predetermined intensity when external power is applied thereto.

In detail, the cylindrical coil 140 is horizontally disposed parallel to a magnet 160 and is fitted over and supported by the coil guide 132 that perpendicularly protrudes from the upper surface of the circuit board 130. Here, the coil guide 132 has a predetermined height and is disposed through an opening 158 formed between bottom plates 156 of a yoke 150, such that the cylindrical coil 140 is disposed in the yoke 150. As such, since the cylindrical coil 140 is disposed in the yoke 150, it can actively interact with the magnet 160.

Meanwhile, in FIG. 2, although the coil guide 132 has been illustrated as being provided on the circuit board 130, the coil guide 132 may be configured such that it is integrally provided on the bracket 120 and the circuit board 130 has therein an opening through which the coil guide 132 is disposed.

The vibration unit which linearly vibrates in the horizontal direction includes the yoke 150, the magnet 160 and a weight 170.

The yoke 150 functions to optimize the magnetic flux generated from the magnet 160 that is disposed in the yoke 150. The yoke 150 has the internal space for containing the magnet 160 therein.

In detail, the yoke 150 includes a rectangular upper plate 152, side plates 154 and the bottom plates 156. The magnet 160 is attached to the lower surface of the upper plate 152. The side plates 154 are bent downwards from the upper plate 152 and extend predetermined lengths. The bottom plates 156 are bent inwards from the lower ends of the side plates 154 and extend parallel to the upper plate 152 such that the opening 158 is formed between the bottom plates 156.

Here, to facilitate the installation of the cylindrical coil 140 into the yoke 150, the side plates 154 are provided only on both side portions of the yoke 150 while both ends of the yoke 150 are open.

The yoke 150 having the above-mentioned configuration reduces leakage flux of the magnet 160 disposed in the yoke 150. This prevents generation of attractive force between the magnet 160 and the bracket 120 that causes sag of the vibration unit. In addition, this increases the range of selection of material for the bracket 120. Furthermore, the yoke 150 is made of material having magnetic permeability capable of forming a magnetic path and surrounds the magnet 160. Hence, the yoke 150 focuses the magnetic flux which interacts with the cylindrical coil 140 on a predetermined portion, thus increasing magnetic flux which is linked with the cylindrical coil 140, thereby enhancing the efficiency of the horizontal linear vibrator.

The magnet 160 generates a magnetic field of a predetermined magnitude and thus forms a magnetic circuit which horizontally vibrates the vibration unit using reciprocal action between the vibration unit and the cylindrical coil 140. The magnet 160 is disposed in the yoke 150. A magnetic fluid may be applied to the outer surface of the magnet 160.

In detail, the magnet 160 is attached to the lower surface of the upper plate 152 of the yoke 150 by a bonding agent or the like. Preferably, the magnet 160 comprises a plurality of magnets which are arranged such that relatively large horizontal displacement can be obtained without increasing the thickness. In this case, to increase magnetic force which links with the cylindrical coil 140, the magnets 160 are disposed such that different poles thereof are placed on the same plane. This will be explained in more detail in the description of FIG. 7 which illustrates the principle of the operation of the horizontal linear vibrator of the present invention.

The weight 170 functions to apply a predetermined weight to the vibration unit to generate sufficient vibrational force. The yoke 150 is inserted into the weight 170.

In detail, the weight 170 has an internal space for containing the yoke 150 therein and is open on the lower surface thereof. The weight 170 includes an upper plate 172 and sidewall plates 174 which are bent downwards from the edges of the upper plate 172. The sidewall plates 174 include longitudinal side plates which extend in the longitudinal direction of the weight 170, and lateral side plates which extend in the lateral direction of the weight 170.

Here, ends of the springs 190 are coupled to the sidewall plates 174 of the weight 170. In the embodiment, plates 180 are provided on the sidewall plates 174 of the weight 170 to facilitate the coupling of the springs 190 to the weight 170. In detail, guide depressions 176 are respectively formed in the sidewall plates 174 of the weight 170. The plates 180 are respectively inserted into the guide depressions 176. Each plate 180 is fastened to the inner end of the corresponding spring 190.

The springs 190 elastically support (provide elastic restoring force to) the vibration unit such that the vibration unit linearly vibrates. The springs 190 are coupled at the inner ends thereof to the vibration unit and coupled at the outer ends thereof to the sidewall plates of the casing 110.

A plate spring or a coil spring can be used as each spring 190. Preferably, the springs 190 are provided on both ends of the vibration unit to have a symmetrical structure.

Meanwhile, it is preferable that magnetic fluid (not shown) is applied to the springs 190 as damping means. Because the magnet fluid is characterized in that it is collected by magnetic flux of the magnets 160, the magnet fluid is applied to the springs 190 and is maintained in this state by the leakage flux of the magnets 160. Thus, when the vibration unit horizontally vibrates, the magnetic fluid prevents the vibration unit from coming into direct contact with the casing 110, thereby preventing contact shock and noise.

Here, the magnetic fluid is formed in such a way that magnetic powder is stably and evenly dispersed in liquid to have a colloidal shape and a surface active agent is added to the liquid to prevent deposition or agglutination of the magnetic powder attributable to gravity or the magnetic field. For example, magnetic fluid formed by dispersing triiron tetroxide or iron-cobalt alloy particles in oil or water is used, and, recently, magnetic fluid formed by dispersing cobalt in toluene is being used. Such magnetic powder is an ultrafine particle powder ranging from 0.01 μm to 0.02 μm and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in the fluid remains constant.

Figure 6:
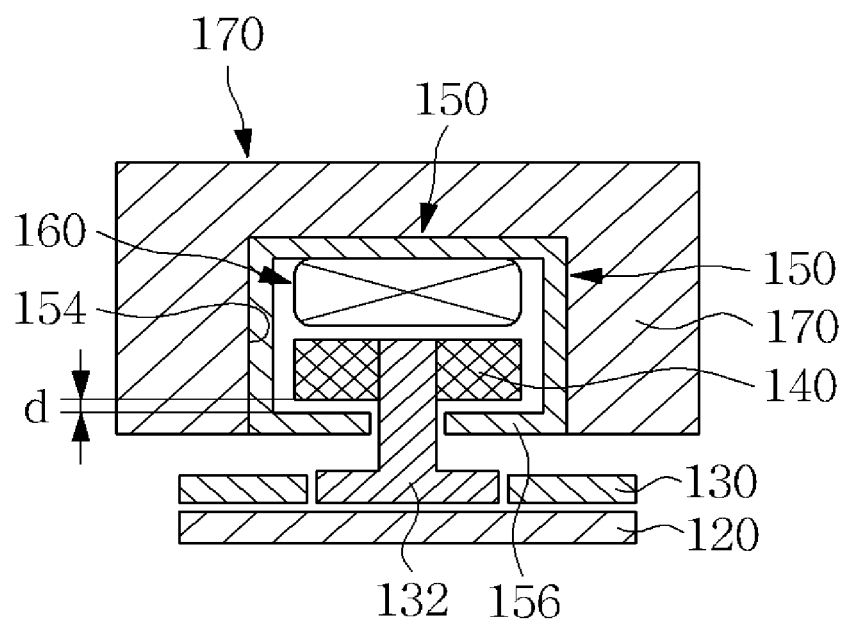
FIG. 6 is a sectional view taken along line AA of FIG. 4.

FIG. 6 is a sectional view taken along line AA of FIG. 4.

As shown in FIG. 6, in the horizontal linear vibrator according to the embodiment of the present invention, the cylindrical coil may be disposed in and supported by the coil guide in the yoke in such a way that a space between the cylindrical coil and the bottom plate of the yoke is formed. In this case, a closed circuit structure, which can increase as much as possible a rate at which magnetic flux generated from the magnet passes through a cross section of the cylindrical coil, can be provided. Therefore, leakage of magnetic flux can be minimized, while magnetic flux density is increased. As a result, the performance and reliability of the operation of the horizontal linear vibrator of the present invention can be further enhanced.

Figure 7:
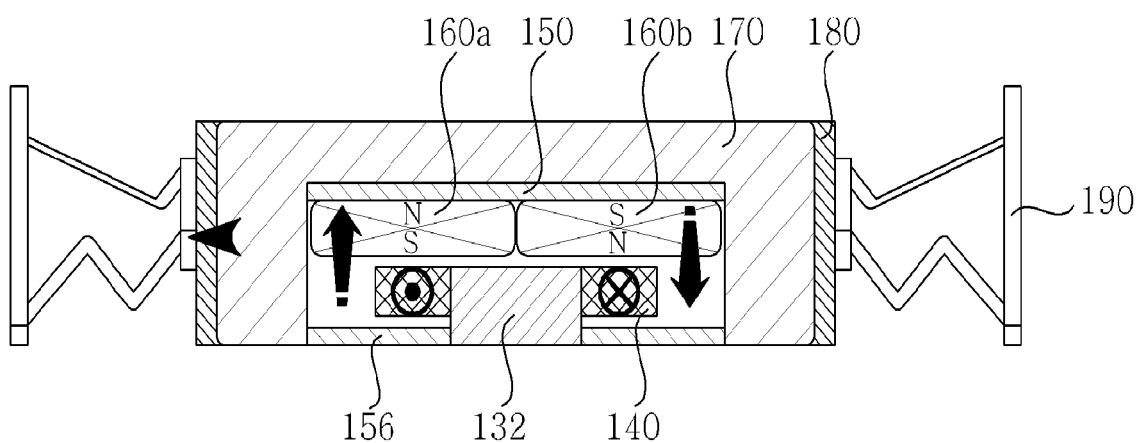
FIG. 7 is an exemplary view illustrating the'principle of operation of the horizontal linear vibrator according to the embodiment of the present invention.

FIG. 7 is a view illustrating the principle of the operation of the horizontal linear vibrator 100 according to the embodiment of the present invention. Although FIG. 7 shows one example for illustrating the principle of the operation of the horizontal linear vibrator 100, the present invention is not limited to this example. The principle of the operation of the horizontal linear vibrator 100 according to the embodiment of the present invention will be explained with reference to FIG. 7.

As shown in FIG. 7, the first magnet 160a and the second magnet 160b are disposed in the yoke 150 such that different poles thereof are placed on the same plane. In this embodiment, the magnetic field formed by the first magnet 160a is oriented upwards, and the magnet field formed by the second magnet 160b is oriented downwards. Here, in the case where current flows through the cylindrical coil 140 below the first magnet 160a in the direction in which it flows out from the surface of the drawing, force is applied to the vibration unit to the left by Fleming's left hand rule. Simultaneously, current flows through the cylindrical coil 140 below the second magnet 160*a* in the direction in which it enters the surface of the drawing, so that force is also applied to the vibration unit to the left by Fleming's left hand rule.

Thereby, the vibration unit which is elastically supported by the springs 190 vibrates in the horizontal direction. Furthermore, the direction of force applied to the vibration unit may be varied by changing the directions of the magnetic poles of the first and second magnets 160*a* and 160*b* or the direction in which current flows through the cylindrical coil 140. This modification should be regarded as falling within the bounds of the above principle of the operation of the horizontal linear vibrator.

As described above, in a horizontal linear vibrator according to the present invention, a vibration unit vibrates in the horizontal direction. Therefore, the present invention does not require space for vertical motion displacement of the vibration unit, thus reducing the thickness of the horizontal linear vibrator.

Furthermore, the present invention is designed such that the horizontal linear vibrator extends a predetermined length in the horizontal direction which is the direction in which the vibration unit vibrates. Hence, sufficient vibrational displacement of the vibration unit can be ensured in the horizontal direction, thus increasing the quantity of vibration.

In addition, a yoke which contains a magnet therein forms a magnetic path of a magnet and prevents leakage of magnetic flux. Therefore, the vibration unit can be prevented from being undesirably biased to one side by magnetic attractive force between the magnet and a bracket.

Although the embodiment of the present invention has been disclosed for illustrative purposes, it will be appreciated that a horizontal linear vibrator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A horizontal linear vibrator, comprising:
   a casing defining an internal space therein;
   a bracket having a plain shape, provided with a circuit board directly on an upper surface thereof and disposed under the casing:
   a cylindrical coil attached to a coil guide and distanced from an upper surface of the circuit board;
   a vibration unit comprising a yoke, a magnet, and a weight, the yoke provided with the magnet comprising a first magnet and a second magnet, the yoke being open on a lower end thereof, the weight coupled to an outer surface of the yoke, and the cylindrical coil provided above bottom plates of the yoke on the circuit board; and
   springs coupled to both ends of the casing or the bracket, the springs elastically supporting the vibration unit to allow the vibration unit to vibrate in a horizontal direction, wherein the yoke comprises:
   an upper plate wherein the magnet is provided directly on a lower surface thereof;
   a side plate bent downwards from the upper plate;
   a bottom plate bent inwards from the side plate, the bottom plate extending a predetermined length parallel to the upper plate, the bottom plate having an opening being formed through a portion of the bottom plate, and
   a coil guide perpendicularly protruding from an upper surface of the bracket,
   the cylindrical coil being inserted into the coil guide, the coil guide supporting the cylindrical coil, and the cylindrical coil being disposed in the yoke through the opening of the bottom plate of the yoke,
   wherein the vibration unit vibrates in the horizontal direction by changing the directions of alternative magnetic field with respect to the first magnet and the second magnet.

2. The horizontal linear vibrator as set forth in claim 1, wherein the cylindrical coil is disposed parallel to the magnets.

3. The horizontal linear vibrator as set forth in claim 1, wherein different poles are disposed at the first magnet and the second magnet, respectively in a same plane.

4. The horizontal linear vibrator as set forth in claim 1, wherein each of the springs comprises a coil spring or a plate spring.

5. A horizontal linear vibrator, comprising:
   a casing defining an internal space therein;
   a bracket having a plain shape, provided with a circuit board directly on an upper surface thereof and disposed under the casing:
   a cylindrical coil attached to a coil guide and distanced from an upper surface of the circuit board;
   a vibration unit comprising a yoke, a magnet, and a weight, the yoke provided with the magnet comprising a first magnet and a second magnet, the yoke being open on a lower end thereof, the weight coupled to an outer surface of the yoke, and the cylindrical coil provided above bottom plates of the yoke on circuit board; and
   springs coupled to both ends of the casing or the bracket, the springs elastically supporting the vibration unit to allow the vibration unit to vibrate in a horizontal direction, wherein the yoke comprises:
   an upper plate wherein the magnet is provided directly on a lower surface thereof;
   a side plate bent downwards from the upper plate;
   a bottom plate bent inwards from the side plate, the bottom plate extending a predetermined length parallel to the upper plate, the bottom plate having an opening being formed through a portion of the bottom plate, and
   a coil guide perpendicularly protruding from an upper surface of the bracket,
   the cylindrical coil being inserted into the coil guide, the coil guide supporting the cylindrical coil, and the cylindrical coil being disposed in the yoke through the opening of the bottom plate of the yoke,
   wherein the vibration unit vibrates in the horizontal direction by changing the directions of alternative magnetic field with respect to the first magnet and the second magnet, and
   wherein plates are provided on both ends of the weight, the plates fastening corresponding ends of the springs to the weight.

* * * * *